United States Patent
Kiraly et al.

(10) Patent No.: US 7,515,743 B2
(45) Date of Patent: Apr. 7, 2009

(54) SYSTEM AND METHOD FOR FILTERING A MEDICAL IMAGE

(75) Inventors: Atilla Peter Kiraly, Plainsboro, NJ (US); Carol L. Novak, Newtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 671 days.

(21) Appl. No.: 11/031,729

(22) Filed: Jan. 6, 2005

(65) Prior Publication Data

US 2005/0152591 A1    Jul. 14, 2005

Related U.S. Application Data

(60) Provisional application No. 60/535,088, filed on Jan. 8, 2004.

(51) Int. Cl.
*G06K 9/00* (2006.01)

(52) U.S. Cl. .................................. 382/131; 382/260

(58) Field of Classification Search ............... 382/128, 382/131, 132, 194, 260, 275, 154, 286; 128/922
See application file for complete search history.

(56) References Cited

U.S. PATENT DOCUMENTS

| | | | | |
|---|---|---|---|---|
| 5,452,367 | A * | 9/1995 | Bick et al. | 382/128 |
| 6,078,680 | A * | 6/2000 | Yoshida et al. | 382/128 |
| 6,470,092 | B1 * | 10/2002 | Li et al. | 382/132 |
| 7,194,117 | B2 * | 3/2007 | Kaufman et al. | 382/128 |
| 2002/0141627 | A1 * | 10/2002 | Romsdahl et al. | 382/131 |
| 2003/0223627 | A1 * | 12/2003 | Yoshida et al. | 382/128 |
| 2004/0064029 | A1 * | 4/2004 | Summers et al. | 600/407 |
| 2004/0151356 | A1 * | 8/2004 | Li et al. | 382/131 |
| 2004/0252870 | A1 * | 12/2004 | Reeves et al. | 382/128 |

FOREIGN PATENT DOCUMENTS

| | | | |
|---|---|---|---|
| EP | 0 915 434 A2 | | 5/1999 |
| WO | WO02/50779 | * | 6/2002 |
| WO | WO02/103065 | * | 12/2002 |

OTHER PUBLICATIONS

Yoshida, H.; Nappi, J.;"Three-dimensional computer-aided diagnosis scheme for detection of colonic polyps"; Dec. 2001, IEEE Transactions on Medical Imaging; vol. 20, Issue 12, pp. 1261-1274.*

Jani, A.B. et al.; "Volume rendering quantification algorithm for reconstruction of CT volume-rendered structures. Part 1. Cerebral Arteriovenous malformations"; Jan. 2000, IEEE Transactions on Medical Imaging; vol. 19, Issue 1, pp. 12-24.*

Yoshida, H.; Nappi, J.;"Three-dimensional computer-aided diagnosis scheme for detection of colonic polyps"; Dec. 2001, IEEE Transactions on Medical Imaging; vol. 20, Issue 12, pp. 1261-127.*

Kruggel et al., "Segmentation of pathological features in MRI brain datasets", Neural Information Processing, 2002, ICONIP '02, Proceedings of the 9$^{th}$ Int'l Conf. on Nov. 18-22, 2002, Piscataway, NJ, IEEE, vol. 5, Nov. 18, 2002, pp. 2673-2677.

Ebert et al., "Volume illustration; non-photorealistic rendering of volume models", Proceedings Visualization 2000, VIS 2000, Annual IEEE Conf. on Visualization, Los Alamitos, CA: IEEE Comp. Soc., US, Oct. 8, 2000, pp. 195-201.

Kovalev et al., "Structural brain asymmetry as revealed by 3D texture analysis of anatomical MR images", Pattern Recognition 2002, Proceedings 16$^{th}$ Int'l Conf. on Quebec City, Quebec, Canada, Aug. 11-15, 2002, IEEE Comput. Soc. vol. 1, Aug. 11, 2002, pp. 808-811.

* cited by examiner

*Primary Examiner*—Andrew W Johns

(57) ABSTRACT

A three dimensional medical image filter computes a value at a given location of the image based upon the properties of a given 3D region. The filter is defined by equations that are functions of the gradient and image values of neighboring locations. The equations determine the final value at the given location. The specific definitions of these equations determine the filter properties and may be adjusted for different applications.

21 Claims, 3 Drawing Sheets

SYSTEM AND METHOD FOR FILTERING A MEDICAL IMAGE

CROSS REFERENCE TO RELATED APPLICATION

This application claims the benefit of U.S. Provisional Application Ser. No. 60/535,088, filed on Jan. 8, 2004, which is incorporated by reference in its entirety.

FIELD OF THE INVENTION

The present invention is directed to a system and method for filtering a medical image, and more particularly, to a system and method for using a three dimensional image filter to compute a value at any given location within an image by taking desired properties of the image into account.

BACKGROUND OF THE INVENTION

Modern three-dimensional (3D) medical images obtained from Computed Tomography (CT) and Magnetic Resonance (MR) scanners contain a wealth of data that is time consuming for physicians to examine and interpret. Various important tools have been introduced to aid in their analysis, such as Computer-Aided Detection (CAD) and Computer-Aided Diagnosis (CADx) and different visualization modalities. Such tools require preprocessing steps that can include segmentation, candidate detection, feature collection, and classification. Classification can be used both to automatically label candidates as detected lesions/areas of suspected disease, and further to classify detected lesions/areas of suspected disease into different types.

In CADx systems that attempt to detect possible abnormalities or disease areas, segmentation, candidate detection, feature collection, and classification steps are commonly used. In segmentation, portions of the image that cannot contain the type of abnormality of interest are eliminated. For example, in colon polyp detection, areas outside the colon would not be considered. In lung nodule detection, areas outside the lungs would be eliminated. This step saves later processing time, since the outside areas do not need consideration, and also eliminates possible sources of false positives. In addition, many CADx systems rely on segmentation to generate a precise boundary between the object of interest and background in order to detect possible candidates or generate features for the candidates.

During the candidate detection stage, algorithms attempt to detect all or most of the possible disease areas. In order to have a high sensitivity, many false positives may also be detected at this stage. Later stages of the algorithm will attempt to remove the false positives while retaining the true positives. For example, in colon polyp detection, the candidate detector will attempt to find all the true polyps, but may also find normal folds of the colon, residual stool, and the ileocecal valve. In lung nodule detection, the candidate detector should find true nodules, but may also find vessel bifurcations, fissural and bronchial thickenings, and scars.

During the feature collection stage, algorithms compute features in and around each candidate that will be used to distinguish true from false positives. For example, in colon polyp detection, collected features may include intensity values and distributions. Similar features may be used for lung nodule detection. The classification stage analyzes the features collected in the previous step in an attempt to remove false positives while still retaining the true positives.

In current CAD methods, false positives that are created by the initial stages of an algorithm may be eliminated in later stages by collecting and analyzing specific features of each polyp candidate. In order to collect these features, some notion of the space occupied by the candidate must be utilized.

A point location alone, such as the detection point, will only permit a limited number of features to be collected. Some kind of estimate of the volume occupied by a colon polyp or lung nodule must exist to properly collect additional features. Typically, a large number of candidates are detected in the early phases of detection. Any feature collection method must operate quickly to process these candidates.

There is a need for a method to accurately identify and characterize potential candidates in an image in order to provide a proper diagnosis of a patient. This process requires recognition of the candidates and the ability to quickly and efficiently eliminate false positives while retaining true positives.

SUMMARY OF THE INVENTION

The present invention is directed to a three dimensional medical image filter that computes a value at a given location of the image based upon the properties of a given 3D region. The filter is defined by equations that are functions of the gradient and image values of neighboring locations. The equations determine the final value at the given location. The specific definitions of these equations determine the filter properties and may be adjusted for different applications.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to the use of a filter to identify properties in an image. One application of the filter is the detection of possible locations of abnormalities or candidates, such as colon polyps or lung nodules. Another application of the filter is the collection of features for candidate discrimination, in order to distinguish true candidates from false positives. Another application is to perform segmentation of a candidate in order to determine its extent within the 3D image.

It is to be understood by those skilled in the art that the present invention may be used with any type of two or three dimensional imaging system for the purpose of viewing the internal structure of a patient. Such structures may include organs, blood vessels, tissue areas or other defined structures. The patient may be a human or an animal. Furthermore, the approach may be applied to images of any dimension since the filter is defined for higher dimensions as well as 2D.

The present invention may also be used in non-medical applications that involve two or three dimensional imaging. One such example could be for security screening to determine the contents or packages or otherwise contained objects. Such a system could be used in a postal delivery environment or for screening belongings in an airport or other high security venue. The present invention could also have industrial applications and be used to inspect or count items being manufactured or assembled.

Figure 1:
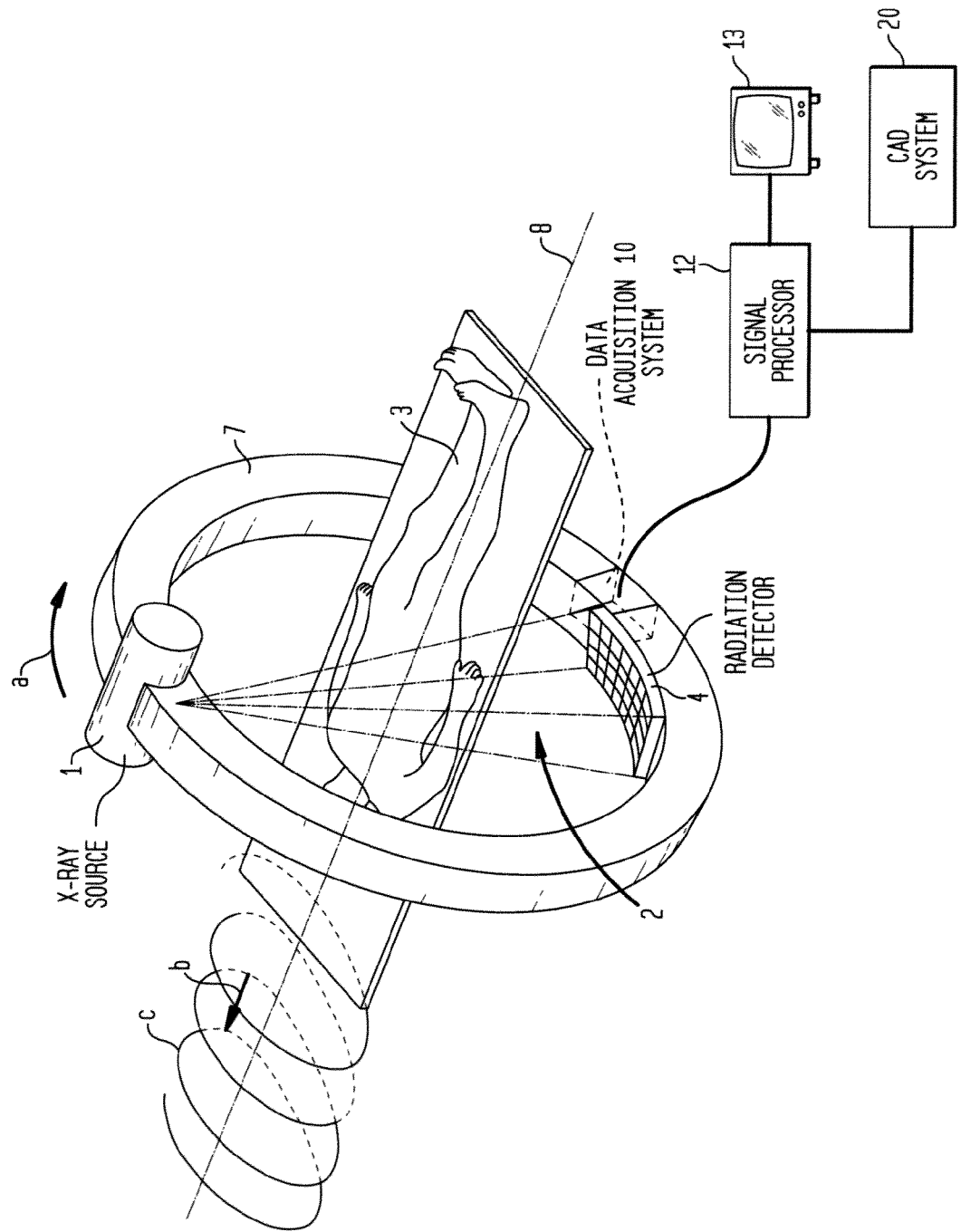
FIG. 1 is a schematic diagram of an exemplary Computed Tomography (CT) system in accordance with the present invention.

FIG. 1 schematically depicts an exemplary Computed Tomography (CT) system in accordance with the present invention. The CT system in conjunction with a Computed Aided Detection (CAD) system can be used to perform a non-invasive procedure on a patient to screen for various medical conditions. Examples of such procedures are virtual colonoscopies or chest screenings for the presence of lesions and possibly cancerous tissue. It is to be understood by those skilled in the art that other imaging modalities can be used without departing from the scope and spirit of the present invention. For example, magnetic resonance imaging (MRI), fluoroscopy or ultrasound imaging could also be used to obtain the imagines. For purposes of explanation, the present invention will be described in the context of use of an exemplary Computed Tomography (CT) system.

The CT is equipped with an X-ray source 1, emitting a pyramidal X-ray beam 2, whose marginal rays are represented by the dot-dashed lines in FIG. 1 that penetrates an object 3 to be examined, for example, a patient, and that is incident on a radiation detector 4. The X-ray source 1 and the radiation detector 4 are, in the exemplary embodiment, mounted opposite to one another on an annular gantry 7.

The X-ray source 1 and the radiation detector 4 thus form a metrological system that can be rotated around the system axis 8 so that the patient 3 can be X-rayed at various projection angles relative to said system axis 8 and at various positions along the system axis 8. The resultant output signals of the individual detector elements are read out by a data acquisition system 10. The signals are sent to a signal processor 12 that computes an image of the patient 3 that, in turn, can be displayed on a monitor 13.

The images scanned by the CT system and computed by the signal processor 12 are transmitted to a CAD system 20 for further processing. The CAD system 20 applies a filter to the image to obtain a response image. This is then used to generate candidates. Features are then collected from the candidates (including features derived from the filter values) and used to classify them as true or false positives. Only the candidates classified as true positives are presented to the physician.

There are a variety of methods for creating a response image for polyp detection. In the case of Computed Tomography Colonography (CTC) or Virtual Colonoscopy (VC), several known methods can be employed. In some known methods, the response image is a volume defined by a filter that computes the probability of a voxel being part of a polyp. In another known method, the response image is comprised of a mesh surface of the colon labeled by a curvature measure where locations within the mesh with curvature values in a certain range indicate a high likelihood of the location being a polyp. Hence, the structure of the response image can differ depending upon the method used to generate it.

The present invention is directed to a three dimensional (3D) image filter, also referred to as a gradient Magnitude, Angle and Radial distance (MARS) filter. The MARS filter is capable of computing a value at any given location in an image based on the properties of the surrounding 3D region. The MARS filter is based on a combination of equations that take certain image properties into account. Specific versions of the MARS filter can be used for candidate detection, object enhancement, segmentation, feature value generation, and feature value collection. Unlike the previously mentioned known methods, the MARS filter does not require an object segmentation or surface segmentation to operate.

Given a 3D location, x, within the volume V to be processed, the MARS filter computes a value based on the properties of the image about x. The value may then be used for several purposes with properly chosen filter parameters. A list of candidates may be generated by classifying all points with values above a threshold or within a certain range as candidates. The output value may also be used as a segmentation confidence to indicate the likelihood of the voxel belonging to the object of interest. In addition, a reverse application of the filter can yield a segmentation of the region by taking the voxels that contributed the most to the final value. Finally, the output value or combined output values of the filter at certain points in the image can be used directly as a feature for classification, so that higher values indicate a higher or lower probability that the candidate is a true positive.

The general equation for the MARS filter is as follows:

$$M(x) = \frac{\int_{\forall y \in V'} S(m, \theta, r, y) \Delta y}{T(V')} \quad (1)$$

where M(x) refers to the output of the MARS filter at x, a 3D location within the image volume. y is another 3D location in the volume. m is the magnitude of the gradient at location y, r is the radial distance from y to x, and θ is the angle between the gradient at location y and the ray from x to y. The integral proceeds over a defined volume V'. This volume can be the entire original volume V, or a defined subset V'. The main function S defines how the values will be weighted at each individual point and summed within the integral and may also depend on the original image values. Hence, the definition of S determines specific properties of the filter. The function T provides a weighting based on the size of the given volume.

In accordance with the present invention, an example will now be described of the MARS filter in which S is defined for the purposes of candidate generation. As indicated above, a different definition of S is used in the MARS filter for candidate generation. In the following, a semi-separable definition for S is used:

$$S(m, \theta, r, y) = S_1(m) S_2(\theta, r) S_3(y) \text{ where} \quad (2)$$

$$S_1(m) = \frac{(\tan^{-1}(m - C_1) + \frac{\pi}{2})}{\pi} \quad (3)$$

$$S_2(\theta, r) = \frac{1}{\sigma\sqrt{2\pi}} e^{\frac{-(r \times \sin\theta)^2}{2\sigma^2}} \times \int_{-r \times \sin(90-\theta)}^{C_2 - r \times \sin(90-\theta)} \frac{1}{\sigma\sqrt{2\pi}} e^{\frac{-x^2}{2\sigma^2}} dx \quad (4)$$

$$S_3(y) = S_1(\min(V(x) \to V(y))) \quad (5)$$

V(x) refers to the value within the image volume at location x. $C_1$, $C_2$, and σ are constants that depend upon the properties of the imaging device and the objects of interest. For example, $C_1$ can be derived from the Hounsfield values for air or soft tissue for CT data. The values for $C_2$ and a are size related and depend on the anatomical object of interest.

The definition of S is used to determine M(x) which is the MARS response at the location x. The response depends on the magnitude, gradient angle, radius, and original image location y. The integration accumulates the responses of all points. In the discrete case, the points are voxels. The response of each point (voxel) is determined by the S function. For the purposes of candidate detection, this general function can be specified in separable terms S1, S2, S3.

This particular definition for S provides an excellent filter for candidate detection within medical images. In this definition, the value of the function T is constant and set to 1. The function $S_1$ provides a scaling based on the magnitude of the given argument. This is used for both magnitude-based scaling and as a component in the $S_3$ function. $S_2$ provides a score based on the distance and direction of the gradient at a specific point. Note that this does not depend on the values obtained by nearby points and hence the computations can proceed in any order around the point x, thus allowing the potential for efficient implementation. Furthermore the computation does not depend upon having a precisely defined segmentation between the organ of interest and the background. Finally, $S_3$ provides a scaling based on the gray-level values along the path from x to y, where the notation V(x)→V(y) refers to the set of voxel intensities on the line connecting voxel x to y.

Figure 2:
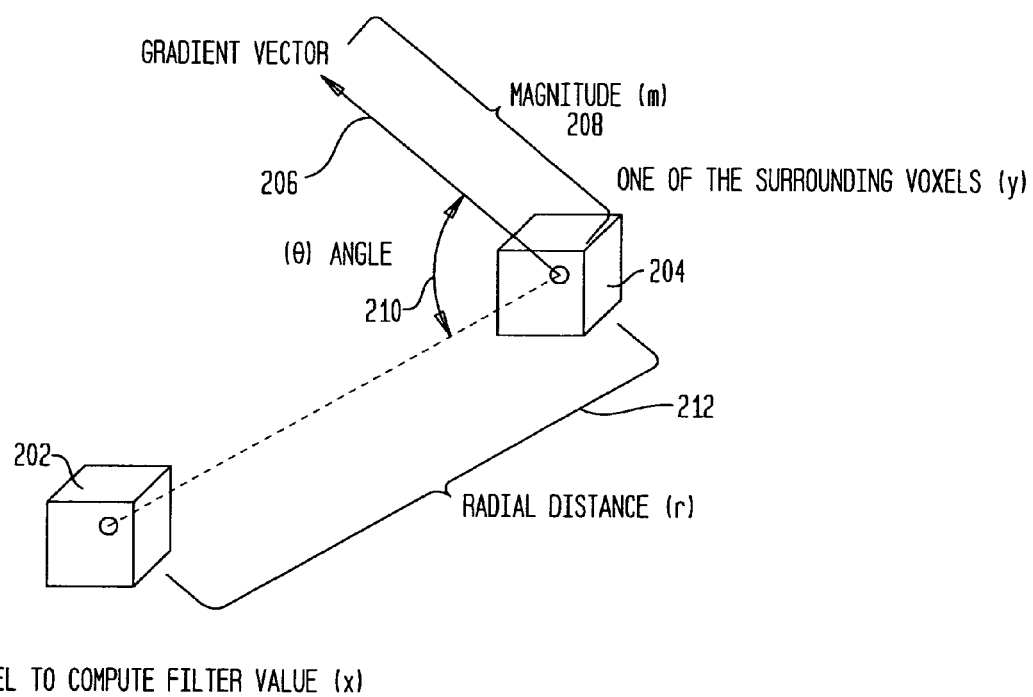
FIG. 2 is a graphical illustration of the application of a MARS filter to voxels in accordance with the present invention.

The following provides examples of this filter applied directly to medical image data. FIG. 2 illustrates a graphical depiction of the computational elements involved in gathering values in order to compute a final value for each voxel using the MARS filter applied with the above definitions to an image. The voxel 202 under computation is shown in white, while a voxel 204 that values are collected from is shown in gray. Voxel 204 is representative of all surrounding voxels relative to voxel 204. For example, the surrounding voxels may be those that neighbor voxel 202. This collection is done for all voxels surrounding the voxel under computation (not shown). Each surrounding voxel has an associated image gradient 206, and the magnitude 208 and angle 210 of that gradient 206, plus the radial distance 212 of the surrounding voxel 204. The final value is determined by an integral of a function of all of the values gathered from each surrounding voxel 204. The final value can be used, for example, to identify potential candidates (i.e., colon polyps).

Figure 3:
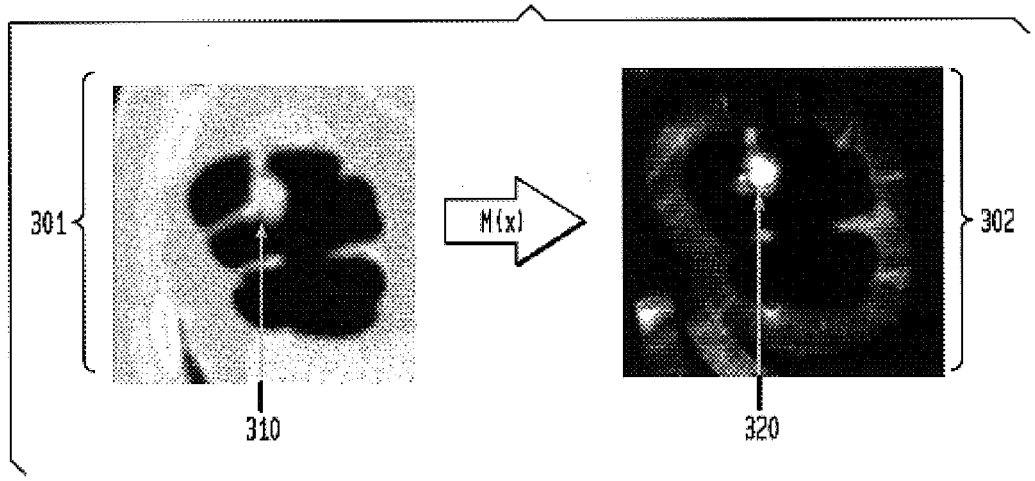
FIG. 3 is a pair of images of the colon before application of the MARS filter and after application of the MARS filter in accordance with the present invention.

FIG. 3 shows the MARS filter with the above definitions applied to an image of the colon. The left image 301 shows a CT slice with a polyp 310 in approximately the center. The right image 302 shows the output of the MARS filter on the same slice. High scores are achieved at the polyp location as signified by high intensity area 320. These scores can be used for candidate generation, feature collection and for object segmentation with some post processing for false positive elimination.

Figure 4:
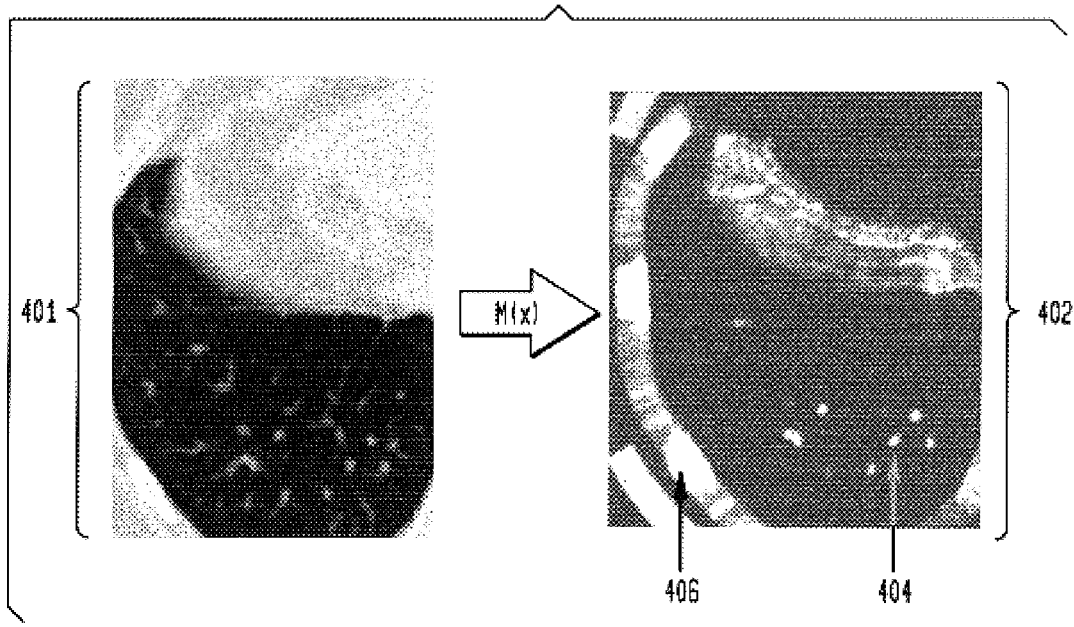
FIG. 4 is a pair of images of the lung before application of the MARS filter and after application of the MARS filter in accordance with the present invention.

FIG. 4 shows the application of the MARS filter with the above definitions applied to an image of the lung. The left image 401 shows a CT slice of the lung. The right image 402 shows the output of the MARS filter on the same CT slice. The filtered image shows application of vessel enhancement and potential lung nodule candidates as exemplified by the areas of high intensity. The areas of high intensity correspond to areas which had high scores. The high intensity areas in this image 402 highlight blood vessels 404, ribs 406. High intensity areas can also signify potential lung nodules. These high scores can then be directly used for candidate generation, as features for false positive elimination, or as a confidence map to determine a binary segmentation of an object.

For the purpose of segmentation, the specific MARS filter described above may also be used to define the probability that a given voxel is part of the object of interest. Thus it may be used to determine the extent of a colon polyp candidate, a possible lung nodule, or a vessel. Given the probability for each voxel obtained from the filter, a final binary segmentation can be achieved by hysteresis thresholding or other known methods. There are several uses for segmenting an object, including determining the region over which to collect features. In addition, a segmentation of a specific object may have other uses, such as localizing arteries with the lungs (as shown in FIG. 4). Once an object has been segmented, it is straightforward to compute its diameter and volume, important features in determining pathology. The reverse application of the filter may also be used to determine voxels of high contribution and use these voxels for the segmentation.

Using another definition for S, the present invention can also be used for feature collection. The following defines S for this purpose. In this definition $S_1$ remains the same. However, $S_2$ is defined as follows:

$$S_2(\theta) = \cos(\theta) \tag{6}$$

$$S_3 \text{ is constant and set to } 1. \tag{7}$$

For the previous case of candidate generation, the volume of integration is the original volume V (V'=V). In this case where the filter is being used for feature collection, the volume of integration V' is defined by the extent of the particular object. For the case of colon polyp detection, V' would contain the set of voxels that are computed as belonging to the polyp candidate. For lung nodule detection, V' would be the set of voxels within the lung nodule candidate. The object extent, or segmentation, defines the region over which the features of that object are computed. The segmentation may be computed from the filter, as described above, or by other means of automatically segmenting an object within an image.

The T function is defined as the number of points within the defined sub-volume. Hence, the purpose of the T function is to normalize the results based on size. In this case, the distance is not used in the equation for $S_2$ since the filter assumes that all points are near to the computed point x.

Having described embodiments for a method for using a three dimensional image filter to compute a value at any given location within an image by taking desired properties of the image into account, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A computer-implemented method for generating a response value for a given voxel within an image based on a function of gradients and gray-level values of surrounding voxels to the given voxel, wherein the surrounding voxels are defined by a chosen subset of the entire image volume, the method comprising the steps of:

a. computing angle, magnitude, and distance values of the gradients of the surrounding voxels;

b. computing a value based on the angle, magnitude and distance values computed in (a) and the gray-level values of the surrounding voxels;

c. combining the values from the surrounding voxels to arrive at a final response value and using the combined values to create a response image, the response image being used to detect candidates within the image by identifying voxels whose function values are characterized by one or more specified thresholds.

2. The method of claim 1 wherein the surrounding voxels are defined by an entire image volume.

3. The method of claim 1 wherein the function is applied to every voxel of the image to create a response image.

4. The method of claim 3, wherein the candidate is an abnormal candidate.

5. The method of claim 1, wherein the candidate indicates an abnormal candidate.

6. The method of claim 1 wherein said image is a three dimensional image.

7. The method of claim 1 wherein the image is a two dimensional image.

8. A computer-implemented method for generating a response value for a given voxel within an image based on a function of gradients and gray-level values of surrounding voxels to the given voxel the method comprising the steps of:
   a. computing angle, magnitude, and distance values of the gradients of the surrounding voxels;
   b. computing a value based on the angle, magnitude and distance values computed in (a) and the gray-level values of the surrounding voxels;
   c. combining the values from the surrounding voxels to arrive at response values, wherein the response values are used to generate features in a Volume of Interest (VOI) around d candidate;
wherein the response value is computed for every voxel of the image to create a response image.

9. The method of claim 8 wherein the VOI is defined by selecting voxels that contributed value above a defined threshold to the final response value.

10. The method of claim 8 further comprising the step of generating features in a Volume of Interest (VOI) surrounding a detected candidate by computing one or more statistical measures of the filter response values within the VOI.

11. The method of claim 8 wherein the features are used to classify candidates as true abnormalities or false positives or to classify abnormalities into categories according to type of abnormality.

12. The method of claim 1 or claim 8 further comprising the step of scaling the final value based upon the number of surrounding voxels.

13. The method of claim 1 or claim 8 wherein the image is a medical image.

14. The method of claim 13 wherein the medical image is an image of a human colon.

15. The method of claim 14 wherein the filter response value is used to detect colon polyps.

16. The method of claim 14 wherein the filter response value is used to classify colon polyp candidates as true polyps or false positives, or to classify colon polyps according to type.

17. The method of claim 14 wherein the filter response value is used to segment colon polyps.

18. The method of claim 13 wherein the medical image is an image of a lung.

19. The method of claim 18 wherein the filter response value is used to detect lung nodules.

20. The method of claim 18 wherein the filter response value is used to classify lung nodule candidates as true nodules or false positives, or to classify lung nodules according to type.

21. The method of claim 18 wherein the filter response value is used to segment lung nodules.

* * * * *